United States Patent Office 2,764,485
Patented Sept. 25, 1956

2,764,485

FOOD SUPPLEMENTS AND PROCESS OF PREPARING THE SAME

Irwin Jerome Bash and Charles Ross, Los Angeles, Calif.; said Bash assignor to said Ross No Drawing. Application March 17, 1954, Serial No. 416,944

2 Claims. (Cl. 99—11)

The present invention relates to nutritional supplements, and more particularly to the integration of the nutritional supplements with a suitable base, such as sodium chloride.

The need for many people to supplement their normal diets with certain vitamins and minerals has been demonstrated. The foods which people eat oftentimes do not contain the proper kinds and ample supplies of vitamins and minerals. In addition, the process of cooking destroys or greatly minimizes the original vitamin content of the food, which contributes to the vitamin deficiency of the consumer.

To overcome their nutritional deficiencies, many people take vitamins or minerals, or both, in pill, capsule or liquid form, which are inconvenient modes of providing the required dietary supplements. Such methods are distasteful and a hardship for many people. It is also a fact that such modes of supplementing diets actually result in excessive intake of vitamins, which are not absorbed by the body, thereby entailing a considerable waste of money.

Accordingly, it is an object of the present invention to provide an improved nutritional supplement that can be taken by a person in a facile and innocuous manner, and in required quantities, thereby avoiding substantial overconsumption of vitamins that cannot be absorbed by the body.

Another object of the invention is to integrate particles of salt or salt-like substances, such as sodium chloride or ammonium chloride, with vitamins and/or minerals, thereby enabling the integrated product to be dispensed upon food in the desired and required quantities in the same manner as ordinary table salt, the opportunity of separation between the salt and the vitamins and/or minerals prior to use of the product being eliminated, which insures the proper and uniform distribution of the vitamins and/or minerals throughout the mass of particles. In fact, each particle includes a homogeneous integration of salt and vitamins and/or minerals.

A further object of the invention is to provide a process for preparing an integrated product in granular or particle form of sodium chloride, or its equivalent, and certain desired vitamins and/or minerals.

This invention possesses many other advantages and has other objects which may be made more clearly apparent from a consideration of several methods and products in which it may be embodied, which will now be described in detail, for the purpose of illustrating the general principles of the invention. It is to be understood, however, that such detailed description is not to be taken in a limiting sense, since the scope of the invention is best defined by the appended claims.

In practicing the invention, it is desired to integrate any desired combination of vitamins or minerals, or both, with salt (sodium chloride or a dietetic salt like ammonium chloride) and to provide the resultant product in particle, powder or granule form of the desired mesh, enabling it to be dispensed from a shaker container in essentially the same manner as ordinary table salt. Each particle of the nutritional combination comprises an integrated homogeneous mixture, the constituents being incapable of separating from each other. The types of vitamins and minerals are preselected, as well as their relative proportions, being added to a saturated or supersaturated solution of sodium chloride, or substitute for the latter, in such proportions as to provide at least the minimum daily vitamin and mineral supplement to a person using table salt in the ordinary manner during mealtime. As an example, the added vitamins can be one or more of the following: A, B1, B2, B6, B12, C and D. The added minerals can be one or more of the following: cobalt, copper, magnesium, potassium, zinc, phosphorus. Other additives can be niacin, folic acid, calcium pantothenate, chlorophyll and/or fluorine.

The vitamins and minerals can be added to the saturated or supersaturated sodium chloride solution in a cold state, or by means of a superheat process to elevate the temperature of the solution and enable a greater proportion of the vitamins and minerals to go into the solution. If a superheat process is used, the temperature will not rise above the point that would cause loss of vitamins. As an example, the temperature of the solution may be elevated to 130 to 140 degrees F.

The resultant solution of sodium chloride, vitamins and minerals is then sprayed under pressure into a suitable sterile container that will not interact with the solution, the pressure spray insuring a more intimate mixture between the components of the solution. The sterile container may be made of glass, Monel metal, or porcelain, or may consist of a suitable non-interacting synthetic resin.

The resultant solution is then dried, as by desiccating it over fuming sulphuric acid, or anhydrous calcium carbonate, or both. The desiccated or dried product is then reduced to powder, granule, or particle size of the desired mesh by trituration, screening or sieving.

The following is a specific example of the proportions of a product including sodium chloride, vitamins, minerals and other substances:

| | Weight |
|---|---|
| Salt (sodium chloride)_____mgs__ | 30,000 |
| Vitamin B1_____mgs__ | 100 |
| Vitamin B2_____mgs__ | 40 |
| Vitamin B6_____mgs__ | 4 |
| Vitamin B12_____mgs__ | 24 |
| Vitamin C_____mgs__ | 250 |
| Niacin_____mgs__ | 200 |
| Folic acid_____mgs__ | 12 |
| Calcium pantothenate_____mgs__ | 40 |
| Phosphorous (as dicalcium phosphate)___mgs__ | 528 |
| Cobalt_____mgs__ | 0.1 |
| Copper_____mgs__ | 0.2 |
| Magnesium_____mgs__ | 2 |
| Potassium_____mgs__ | 0.05 |
| Zinc_____mgs__ | 1.5 |
| Chlorophyll_____mgs__ | 480 |

All of the above components (except the sodium chloride) are added to a saturated or supersaturated solution of the sodium chloride and the above process followed to produce the homogeneous mixture of integrated particles of salt, vitamins, minerals and other substances. The proportions given above can be varied, and substances can be omitted from the list given above, if desired. For that matter, other substances can be added, depending upon the components and relative proportions of the components desired in the resultant product. In place of sodium chloride, a dietetic salt, such as ammonium chloride, can be used, particularly for persons precluded by reasons of health from taking sodium chloride.

The resultant product consists of particles, each of which is a homogeneous integration of vitamins and salt, as well as with minerals, if the latter are added. The components of each particle remain adherent to each other, insuring that the required minimum amount of vitamins and/or minerals will be added to a person's diet whenever the product is added to food in the usual manner that salt is added thereto at meals. The integration of the salt with the vitamins and other elements or compounds causes the components to break up more readily and form co-enzymes, rendering the components more readily assimilable by the person's body and aiding general metabolism.

In effect, each particle is in the nature of a miniature vitamin pill, but its small size does not present the difficulties of taking pills encountered by some people. The product can be placed within and dispensed from a shaker container, being used as a seasoning in the same manner as ordinary table salt. It can be used to season meats, fish, poultry, fruits, vegetables, and the like. With the specific proportions set forth above contained in an ordinary shaker container, about six shakes per meal will supply the daily minimum vitamin requirements for an average person.

The inventors claim:

1. The method of preparing homogeneous integrated particles of table salt including a minor proportion of vitamins which will not separate from the salt upon standing or shaking, which comprises dissolving table salt in water to form a saturated solution, adding vitamins to the solution, the temperature of the solution being insufficiently high to cause deterioration of the vitamins, spraying the combination of salt solution and vitamins under pressure into a vessel in order to secure an intimate and homogeneous mixture, drying and grinding the resulting product.

2. Homogeneous integrated particles of table salt including a minor proportion of vitamins which will not separate from the salt upon standing or shaking, prepared by the method of claim 1.

References Cited in the file of this patent

UNITED STATES PATENTS

| | | |
|---|---|---|
| 2,114,775 | Cerecedo | Apr. 19, 1938 |
| 2,550,726 | Searle | May 1, 1951 |

OTHER REFERENCES

Ser. No. 356,560, Hara (A. P. C.), published May 11, 1943.

Howard: Modern Drug Encyclopedia, 5th ed. (1952), page 1207.